United States Patent [19]
Butterworth et al.

[11] 3,940,498
[45] Feb. 24, 1976

[54] CHILL-PROOFING WITH SYNTHETIC MAGNESIUM SILICATES

[75] Inventors: Elbert Roy Butterworth, Littleton; Willard John Duensing, Lakewood, both of Colo.

[73] Assignee: Johns-Manville Corporation, Denver, Colo.

[22] Filed: Sept. 3, 1974

[21] Appl. No.: 502,267

[52] U.S. Cl. ............... 426/423; 252/449; 426/12; 426/17; 426/422
[51] Int. Cl.² .... C12C 7/14; C12H 1/02; C12H 1/04
[58] Field of Search .......... 426/11, 12, 16, 15, 423, 426/330, 365, 422, 17; 252/450, 454, 449

[56] References Cited
UNITED STATES PATENTS

| | | | |
|---|---|---|---|
| 2,416,007 | 2/1947 | Joachim | 426/365 |
| 3,251,693 | 5/1966 | Brenner | 426/12 |
| 3,458,393 | 7/1969 | Battista | 252/450 X |
| 3,557,023 | 1/1971 | Raible | 252/450 |
| 3,617,215 | 11/1971 | Sugahara et al. | 252/450 X |

*Primary Examiner*—David M. Naff
*Attorney, Agent, or Firm*—Robert M. Krone; James W. McClain

[57] ABSTRACT

Undesirable protein and polyphenol molecules are removed from aqueous liquids or suspensions, such as wort, wine, or beer, by contacting the liquid with acid-treated synthetic magnesium silicates containing less than about 14% magnesium oxide. The resultant liquid is more resistant to chill haze formation. Even better results are obtained if a polyamide is blended with the acid-treated synthetic silicate prior to contact with the liquid. A filter aid, such as diatomite, can also be combined with the acid-treated synthetic magnesium silicate and/or the blends containing the polyamide.

19 Claims, No Drawings

CHILL-PROOFING WITH SYNTHETIC MAGNESIUM SILICATES

This invention relates to the use of acid-treated synthetic magnesium silicates, either alone or as a member of a blend, to remove or to reduce the concentration of undesirable ingredients in aqueous liquids or suspensions such as vinegar and fermented and/or nonfermented beverages or precursors. More particularly, this invention relates to the stabilization (chill-proofing) of vinegar and such beverages as beer, ale, wine, apple juice, apple cider, grape juice, pineapple juice, etc.

BACKGROUND OF THE INVENTION

Many beverages, juices, and vinegar develop a haze upon an elapse of time and/or change in temperature. For example, many freshly filtered beers, if not specially treated, are hazy at a temperature of about 0°C. Some of this haze will usually disappear when the beer reaches room temperature. The fraction of the total haze which is temperature sensitive is called "chill haze." As the storage time in bulk, kegs, bottles, etc., increases, the amount of haze formed on chilling will also increase and while some of the haze formation continues to be temperature sensitive, the amount of permanent haze increases until it finally becomes visible even at room temperature. The practice in this country of drinking cold beer aggravates the haze problem. Understandably, a hazy beer is undesirable.

The haze in beer is generally understood to contain substantial amounts of proteins, polyphenols, and other materials. It is likely that the haze is caused by the higher molecular weight proteins and polyphenols. Both the surface active protein molecules and the higher molecular weight polyphenol molecules contribute to the basic character of the beer. Therefore, selective removal is necessary to stabilize the beer without adversely affecting foam and producing an imbalance in the flavor, or a lack of character in the beer.

DESCRIPTION OF PRIOR ART

A large number of different treatments have been proposed for stabilizing or chill-proofing beer and other beverages.

One satisfactory method of chill-proofing beer, disclosed in U.S. Pat. No. 3,251,693, involves the addition of certain silicates, particularly synthetic calcium, magnesium or zinc silicates, to the wort or beer at any stage prior to final filtration, either alone or along with a filter aid.

It is also known to use polyvinyl polypyrrolidone (PVPP) to combine with the polyphenols to precipitate them more quickly. The use of PVPP to stabilize beer is described in U.S. Pat. Nos. 2,688,550; 2,811,449; 2,860,987; 2,875,062; 2,939,791; and 2,943,941.

BRIEF SUMMARY OF THE INVENTION

It has now been discovered that when synthetic magnesium silicates normally having a magnesium content, on an oxide basis, of at least about 15 weight percent, such as the magnesium silicates disclosed in U.S. Pat. No. 3,251,693, are treated with acid to reduce the magnesium oxide content to below about 14%, preferably below about 13%, and most preferably below about 12%, by weight, there results surprising improvements in the chill-proofing properties of the material, as compared with the conventional synthetic magnesium silicates.

The acid-treated synthetic magnesium silicates can either be used alone or as a member of a blend with one or more other members selected from the group comprising diatomite, perlite, polyamides such as PVPP or NYLON 66, cellulose, and other conventional haze control agents. Diatomite and perlite serve as filter aids to improve flow properties during filtering, as nucleating agents, and as drainage and filtration aids in the settled trub to cause less beer loss. The PVPP or NYLON 66 effects the removal of undesirable anthocyanagens or polyphenols. Such blends provide the user with a single product and avoid the necessity of adding separate stabilization agents individually at one or more locations in the process.

The acid-treated synthetic magnesium silicates, either alone or as a member of a blend, can be added in a brewing process to the kettles of hot or cold wort, to ruh beer, at more than one of these locations, or other locations in the process. If the acid-treated synthetic magnesium silicate is added alone, it is preferred to add it either in the brew kettle or during cellar storage. If added as a member of a blend, it is preferred to add the blend in cellar storage. In a wine process, or in the processing of vinegar and fruit juices, the acid-treated synthetic magnesium silicate or blend could be added before or after primary filtration.

The acid-treated synthetic magnesium silicates of the present invention are prepared by treating conventional synthetic magnesium silicates with an acid to convert the magnesium in the magnesium silicate to a soluble magnesium compound and then washing the acid-treated magnesium silicate to remove any excess acid and the soluble salts formed by the acid treatment. As known, many acids are available that will perform the above-described function, but it is preferred to use sulfuric acid. It is also preferred to dry the washed acid-treated magnesium silicate prior to using it as a chill haze control agent.

DETAILED DESCRIPTION AND PREFERRED EMBODIMENTS

Acid-treated synthetic magnesium silicates are useful as chill haze control agents. Mineral acid-treated magnesium silicates are preferred and most preferred are sulfuric acid-treated synthetic magnesium silicates.

The conventional synthetic silicates used in the present invention are well known and are produced by hydrothermal reaction of silica, such as diatomite, with magnesia. The reaction product is conventionally given a light acid wash, e.g., 160 pounds of concentrated sulfuric acid per ton of product to remove any excess and unreacted magnesia, followed by a water wash. This light acid wash conventionally used produces the precursor of the product used in the present invention, which product is the result of an additional acid treatment typically of about 740 lbs. of concentrated sulfuric acid per ton of the precursor material. Typical physical and chemical properties of a conventional magnesium silicate precursor material used to make a product useful in the present invention are shown in Table I.

TABLE I

| Typical Chemical Analysis | Synthetic Magnesium Silicate |
|---|---|
| $SiO_2$ | 61 – 68 |
| CaO | 1.0 |

TABLE I-continued

| Typical Chemical Analysis | Synthetic Magnesium Silicate |
|---|---|
| $Al_2O_3$ | 4.3 |
| $Fe_2O_3$ | 1.6 |
| MgO | 15 – 22 |
| $Na_2O + K_2O$ | 1.0 |
| Ignition Loss | 9.1 |
| Typical Physical Properties | |
| Color | Light gray |
| Brightness (TAPPI) | 54 |
| Particle Size | 2 wt. percent retained on a 325 mesh screen |
| pH (10% water slurry) | 7.6 |
| Surface Area | 180 $m^2/g$ |
| Specific gravity | 2.41 |
| Refractive index | 1.54 |

The acid-treated synthetic magnesium silicate of the present invention is produced by contacting a conventional magnesium silicate, such as the one described in Table I, with an acid that will convert all or a portion of the magnesium contained in the silicate to a soluble salt, followed by washing the so-treated silicate to remove all or most of the soluble magnesium salt. Although many acids could be used, it is preferred to use sulfuric acid. The concentration of the acid used will depend upon the amount of magnesium oxide desired to be removed from the conventional magnesium silicate. For example, one mole of pure sulfuric acid should theoretically remove about one mole of magnesium oxide in the form of water soluble magnesium sulfate. Therefore, about 4.5 milliliters of 98% concentration sulfuric acid would theoretically be required to remove 100% of the magnesium oxide from 20 grams of synthetic magnesium silicate containing 16.6% magnesium oxide. It has been found, though, that the actual amount of magnesium oxide removed is less than that calculated. Thus, it is usually necessary to treat with concentrations that exceed concentrations stoichiometrically calculated. The completeness of the reaction is limited by available contact time, temperature, and other variables. For example, an amount of concentrated sulfuric acid stoichiometrically calculated to remove 50% of the magnesia from a conventional synthetic magnesium silicate actually removed only about 40% after two hours contact time at 80°C.

Although drying of the washed product is not absolutely necessary, it is preferred from the standpoints of packaging the acid-treated product and of using the acid-treated product as a chill haze control agent. Conventional drying techniques, particularly flash drying techniques, are satisfactory, such as tumbling, fluid bed, etc.

The particle size of the acid-treated synthetic magnesium silicate is not critical, but if the particle size is too small, the requirements of the filtration step to remove the chill haze control agent would be more limited, and if the particle size is too large, its activity will be reduced, thus requiring larger dosages of the chill haze control agent to effect the same stability. A typical particle size of 95 to 100% minus 325 mesh is satisfactory.

To determine the effectiveness of acid-treated synthetic magnesium silicates, a conventional synthetic magnesium silicate, and an acid-treated synthetic calcium silicate on chill haze control, the SASPL technique, was selected. The SASPL (saturated ammonium sulfate precipitation limit) technique is an accepted method for determining precipitable protein in liquids or liquid suspensions by titrating, preferably with a partially saturated ammonium sulfate (PSAS). In this technique, PSAS is slowly added to the liquid and the amount of PSAS required to cause a sudden increase in turbidity (breakpoint) is determined. The PSAS complexes with protein molecules of a specific size range to cause a precipitate. The resulting haze can be measured by a turbidimeter in terms of JTU's (Jackson Turbidity Units) or any other accepted turbidity units.

Since chill haze control agents adsorb some of the haze forming proteins and are then removed by filtration, the breakpoint should be higher for an effectively chill-proofed or stabilized liquid than for an untreated liquid. Consequently, the breakpoint value, in terms of PSAS addition, is an indication of the chill-proofing effectiveness of the adsorbent used.

The following examples demonstrate the unexpected chill-proofing effectiveness of the acid-treated synthetic magnesium silicates as compared with the conventional magnesium and calcium silicates disclosed in U.S. Pat. No. 3,251,693 and an acid-treated synthetic calcium silicate.

EXAMPLE 1

To make a wort for use in testing the chill haze control agents of this invention as well as conventional adsorbents and an acid-treated conventional synthetic calcium silicate, a concentrated light wort, BLUE RIBBON Hop Flavored Malt Syrup, was mixed with fourteen equal volumes of water. Sorbic acid was added in sufficient amounts to produce a concentration of 100 parts per million as a preservative, and the pH of the wort was adjusted to 4.2 using concentrated phosphoric acid. The resultant wort, which had been heated slightly to make sure all the soluble ingredients were in solution, was cooled to room temperature and filtered to brilliancy. A 50-milliliter sample of this wort was taken and labeled "No Treatment." Three 300-milliliter samples were taken and labeled "Acid-Treated Synthetic Magnesium Silicate," "Conventional Synthetic Magnesium Silicate," and "Acid-Treated Synthetic Calcium Silicate" respectively.

The actual acid treatment procedure used was as follows:

a. a 10% slurry, by weight, of conventional synthetic magnesium silicate in water was prepared;

b. the desired volume of concentrated sulfuric acid was added to this slurry;

c. the slurry was heated to 80°C with agitation and the reaction was continued until the pH rose and leveled off with respect to time;

d. the slurry was filtered to separate the liquid from the acid-treated silicate particles;

e. the filter cake was washed with water, preferably distilled, to remove any excess acid and the soluble salts formed by the acid treatment; and f. the washed filter cake was oven-dried to reduce the free moisture content to below about 5%, preferably below about 3% by weight.

The same treatment was used to prepare the acid-treated synthetic calcium silicate except that hydrochloric acid was used.

Next 0.2 gram, corresponding to a dosage of 16 lbs./100 bbls., of the indicated chill haze control agent was added to each 300-milliliter sample of wort and agitated in a shaker for 30 minutes to simulate a 30-minute contact time in a brewing process. The samples were then filtered through filter paper to remove the adsorbent. A 50 ml sample was removed from each 300 ml sample and, along with the 50 ml untreated wort sample, were titrated in accordance with the SASPL technique described above using 53.5% saturated ammonium sulfate solution.

The conventional magnesium silicate used was the same type of material as that disclosed in Table I of U.S. Pat. No. 3,251,693. The acid-treated and washed synthetic magnesium silicate chill haze control agent used was one produced by treating the conventional synthetic magnesium silicate with 3.6 ml of concentrated sulfuric acid for each 20 grams of magnesium silicate. It was determined by chemical analysis that the synthetic magnesium silicate contained about 15% magnesia before the acid treatment and about 11% magnesia after treatment.

The conventional synthetic calcium silicate used was the same type of material as that described first in Table I of U.S. Pat. No. 3,251,693. The acid-treated synthetic calcium silicate used was prepared by treating the conventional synthetic calcium silicate with sufficient hydrochloric acid to theoretically remove about 80% of the calcium oxide contained in the conventional synthetic calcium silicate. Hydrochloric acid was used to treat the conventional synthetic calcium silicate because sulfuric acid does not produce a soluble calcium compound.

The turbidimeter used contained a light bulb which was a potential source of heat to the sample. Since the haze that forms in the wort during titration is at least partially temperature sensitive, each sample was maintained in the turbidimeter for the same length of time, 45 seconds, prior to recording the turbidity. The results of the SASPL test are shown in Table II.

TABLE II

| Wort Sample | Breakpoint (ml of 53.5% SAS per 50ml of Wort |
|---|---|
| Untreated Wort | 3.3 |
| Conventional Synthetic Magnesium Silicate — 15% MgO | 5.4 |
| Acid-Treated Synthetic Magnesium Silicate — 11% MgO | 5.9 |
| Conventional Synthetic Calcium Silicate | 6.6 |
| Acid-Treated Synthetic Calcium Silicate | 5.4 |

As shown by the data in Table II, and as was expected from the disclosure in U.S. Pat. No. 3,251,693, the stability of the wort was improved by treatment with conventional synthetic magnesium silicate and the conventional synthetic calcium silicate. Although the conventional synthetic calcium silicate produced a higher stability than the conventional synthetic magnesium silicate, the latter is preferred for use because of the undesirability of calcium ions in beer. The data also show that acid treating the conventional synthetic magnesium silicate produced a material which unexpectedly produced a further and significant improvement in the stability of the wort. This result is even more surprising considering that the acid treatment of the synthetic calcium silicate produced a material which performed in an inferior manner as compared with the conventional synthetic calcium silicate.

EXAMPLE 2

To determine the effects of various degrees of acid treatment on conventional synthetic calcium and magnesium silicates the following tests were made. Conventional synthetic magnesium silicate, used in Example 1, was treated with various amounts of concentrated sulfuric acid. Also, conventional synthetic calcium silicate, used in Example 1, was treated with sufficient concentrations of hydrochloric acid to theoretically remove about 40% and 80% respectively of the calcium oxide content contained therein. These acid-treated materials, after having been washed thoroughly and dried, were then tested in the same manner as described in Example 1. The SASPL breakpoints obtained for these acid-treated materials are reported in Table III.

TABLE III

| Chill Haze Control Agent | Amount Conc. $H_2SO_4$ per 20 gms. mtl. (ml) | Breakpoint (ml of 53.5% SAS per 50ml of Wort) |
|---|---|---|
| Magnesium Silicate | 0 | 5.4 |
| Magnesium Silicate | 1.8 | 5.72 |
| Magnesium Silicate | 2.7 | 5.85 |
| Magnesium Silicate | 3.6 | 5.9 |
| Magnesium Silicate | 4.5 | 5.94 |
| Calcium Silicate | 0 | 6.6 |
| Calcium Silicate | 5.2 | 5.9 |
| Calcium Silicate | 10.4 | 5.4 |

The data in Table III show that as more acid was used in the treatment, and thus as more of the magnesium oxide was removed from the conventional synthetic magnesium silicate by acid treatment, the chill haze control property of the resultant material increased significantly. In contrast, increasing the amount of calcium oxide removed from the conventional synthetic calcium silicate by acid treatment results in deterioration of the chill haze control property of the resultant product.

To obtain sufficient improvement in the chill haze control property of the acid-treated magnesium silicate to justify the cost of the acid treatment, the magnesium oxide contained in the conventional synthetic magnesium silicate starting material should be reduced to less than about 14% by the acid treatment. As shown in the chemical analysis from Table I, the conventional synthetic magnesium silicate starting material also contains minor amounts of calcium oxide, alumina, etc. The acid treatment will inherently remove portions of these minor ingredients in addition to magnesium oxide.

Another surprising result of the acid treatment is that the acid-treated magnesium silicate is significantly more hydrophillic than the conventional synthetic magnesium silicate resulting in a product that more rapidly and completely disperses when added to an aqueous liquid.

EXAMPLE 3

The purpose of these tests was to determine the relative concentrations of a conventional synthetic magnesium silicate, and one which had been acid treated in the same manner described in Example I, required to produce the same stability in the wort in the same contact time. The dosage of these two chill haze control agents was varied between 2 and 16 lbs./100 bbls. with a constant contact time of 30 minutes. The wort treated and the method of treatment were the same as described in Example 1. The results of these tests are shown in Table IV.

TABLE IV

| Chill Haze Control Agent | Dosage lbs./100 bbls. | Breakpoint (ml 53.5% SAS per 50ml of Wort) |
|---|---|---|
| Conventional Synthetic Magnesium Silicate | 2 | 3.65 |
| Acid Treated Conventional Synthetic Magnesium Silicate | 2 | 4.0 |
| | 4 | 4.20 |
| Acid Treated Conventional Synthetic Magnesium Silicate | 4 | 4.50 |
| | 8 | 4.90 |
| Acid Treated Conventional Synthetic Magnesium Silicate | 8 | 5.30 |
| | 16 | 5.4 |
| Acid Treated | 16 | 5.9 |

The data from Table IV show a significant improvement in the chill-proofing property, as a result of the acid-treatment of the conventional synthetic magnesium silicate, throughout a broad dosage range. These data show that a significantly lower concentration of acid-treated synthetic magnesium silicate is required to produce equivalent stability in wort to that produced by the conventional synthetic magnesium silicate adsorbent. To the user, this advantage would be important in terms of lower costs. The same dosage of the acid-treated conventional synthetic magnesium silicate would also reduce the contact time required to produce the same stability produced by the conventional synthetic magnesium silicate adsorbent. Thus, the user would have a very desirable option of either producing a beverage having a superior stability by maintaining the dosage level and contact times essentially similar to those previously used with the conventional synthetic magnesium silicate adsorbent, or producing a beverage having conventional stability by reducing the adsorbent dosage level, the contact time, or both.

The above Examples show the use of acid-treated synthetic magnesium silicates used alone as a chill haze control agent, but these products can also be used in conjunction with other conventional chill-proofing agents such as the synthetic magnesium silicates disclosed in U.S. Pat. No. 3,251,693, hectorite, acid activated bentonites, or any of the other conventional chill haze control agents known in the art. Also, the acid-treated conventional magnesium silicate of the present invention can be effectively used as a member of a blend with the other members of the blend including either a filter aid, such as perlite or diatomite or adsorbents for polyphenols such as polyamides like PVPP or NYLON 66 or both.

The degree of acid treatment used to make the products of the present invention and the amount of the resultant product used in stabilizing aqueous liquids will depend upon the amount of undesirable ingredients to be adsorbed. As shown above, this can be easily determined for each different application. It is also possible to reduce the amount of acid-treated conventional synthetic magnesium silicate needed by the addition of protein-modifying enzymes, such as those described in U.S. Pat. No. 3,251,693.

To determine the effectiveness of an acid-treated conventional magnesium silicate in blends containing PVPP the following tests were made.

EXAMPLE 4

Blends were prepared by dry mixing acid-treated synthetic magnesium silicate, made by treating a conventional magnesium silicate having a magnesium oxide content of 20.5% with 700 lbs. concentrated sulfuric acid per ton of magnesium silicate at a temperature of 80°C for about three hours to reduce the magnesium oxide content to about 12.7%, with POLYCLAR AT, a polyvinyl polypyrrolidone marketed by GAF Corp., in various weight ratios as shown in Table V. A wort, prepared as described in Example 1, was treated with each of the blends at a dosage level of 16 lbs./100 bbls. and a contact time of 30 minutes. The treated wort samples were then filtered to remove the adsorbent blends. The SASPL breakpoint, using 50% saturated SAS, and percent anthocyanogen, polymerized polyphenols, removal were determined. The results are reported in Table V along with the results obtained by treating with PVPP and acid-treated synthetic magnesium silicate alone.

TABLE V

| Composition of Chillproofing Agent | | SASPL Breakpoint (ml 50% SAS/50 ml Wort) | Anthocyanogen Removal (%) |
|---|---|---|---|
| PVPP (%) | Acid-Treated Magnesium Silicate (%) | | |
| Control (No Absorbent) | | 5.9 | 0 |
| 100 | 0 | 6.57 | 19.0 |
| 30 | 70 | 8.35 | 14.3 |
| 25 | 75 | 8.53 | 10.3 |
| 20 | 80 | 8.5 | 12.5 |
| 15 | 85 | 8.45 | 11.0 |
| 10 | 90 | 8.6 | 10.0 |
| 5 | 95 | 8.77 | 6.3 |
| 0 | 100 | 8.75 | 3.6 |

The SASPL breakpoints shown in Table V are generally higher than those reported earlier in the specification; however, their relative positions with respect to the control are about the same. This difference was caused by a different concentration of PSAS titrating solution than used in the tests reported in the earlier examples.

The results show that while the use of PVPP alone removed the most anthocyanogens, the SASPL breakpoint was relatively low indicating that PVPP was not removing the undesirable protein molecules. The best results were achieved with blends of PVPP and acid-treated magnesium silicate wherein the PVPP content was within the range of about 5 to about 30 weight percent, preferably about 10 to about 30 weight percent. The preferred blends show a surprising cooperation between the separate adsorbents that results in an improved anthocyanogen removal without a significant decrease in SASPL breakpoint. This balance is desirable for the production of well stabilized beer having excellent taste and good foam characteristics.

It is possible, and in some cases desirable, to also include a filter aid with the acid-treated synthetic magnesium silicate, e.g., diatomite, perlite, cellulosic fibers, etc.

In describing the invention, certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead is to be limited only by the claims appended hereto.

What I claim is:

1. A method of stabilizing aqueous liquids or aqueous liquid suspensions against chill haze formation comprising contacting said liquid or said suspension with an acid-treated synthetic magnesium silicate containing 13% or less by weight of magnesium, on an oxide basis, in an amount effective to eliminate or reduce said chill haze and seperating said silicate from said liquid or liquid suspension to provide an aqueous liquid or aqueous liquid suspension resistant to chill haze formation.

2. The method of claim 1 wherein said acid is an acid that forms a water-soluble compound upon reaction with magnesium oxide.

3. The method of claim 2 wherein the acid is a mineral acid.

4. The method of claim 3 wherein the mineral acid is a sulfuric acid and the magnesium oxide content is less than about 12%.

5. The method of claim 1 wherein the liquid suspension is wort.

6. The method of claim 1 wherein the liquid or suspension is selected from the group consisting of vinegar, beer, malt liquor, and ale.

7. The method of claim 1 wherein the liquid or suspension is wine.

8. The method of claim 4 wherein the liquid suspension is wort.

9. The method of claim 4 wherein the liquid or suspension is selected from the group consisting of vinegar, beer, malt liquor and ale.

10. The method of claim 1 wherein in addition to the acid-treated synthetic magnesium silicate there is also added a conventional filter aid material which is later removed in a filtering step.

11. The method of claim 1 wherein in addition to the acid-treated synthetic magnesium silicate there is also added one or more conventional chill haze control agents.

12. The method of claim 10 wherein in addition to the acid-treated synthetic magnesium silicate and a filter aid material there is also added one or more conventional chill haze control agents.

13. The method of claim 11 wherein the conventional chill haze control agent is polyvinyl polypyrrolidone.

14. A method of stabilizing an aqueous liquid or aqueous liquid suspension selected from the group consisting of wort, beer and wine against chill haze formation comprising contacting said liquid or suspension with particles of acid-treated synthetic magnesium silicate, having a magnesium content of 13% or less by weight in an amount effective to stabilize said liquid or suspension against chill haze formation and separating said particles from said liquid or suspension to provide a liquid or suspension resistant to chill haze formation.

15. The method of claim 14 wherein said acid contains sulfur as one of the constituents of the acid molecule.

16. The method of claim 15 wherein the acid is a mineral acid.

17. The method of claim 16 wherein the acid is sulfuric acid and the magnesium content, on an oxide basis is less than about 12%.

18. The method of claim 14 wherein the acid-treated magnesium silicate is added in an amount to provide a concentration of at least 2 pounds of acid-treated synthetic magnesium silicate per 100 barrels of beer.

19. The method of claim 18 wherein polyvinyl polypyrrolidone is also added in an amount less than the amount of acid-treated synthetic magnesium silicate added.

* * * * *